July 26, 1938.  D. RAY  2,124,674

BOTTLE HOODING MACHINE

Filed March 1, 1937  9 Sheets-Sheet 1

Inventor
Don Ray

By Lyon & Lyon
Attorneys

July 26, 1938.  D. RAY  2,124,674
BOTTLE HOODING MACHINE
Filed March 1, 1937  9 Sheets-Sheet 4

Inventor
Don Ray
By Lyon & Lyon
Attorneys

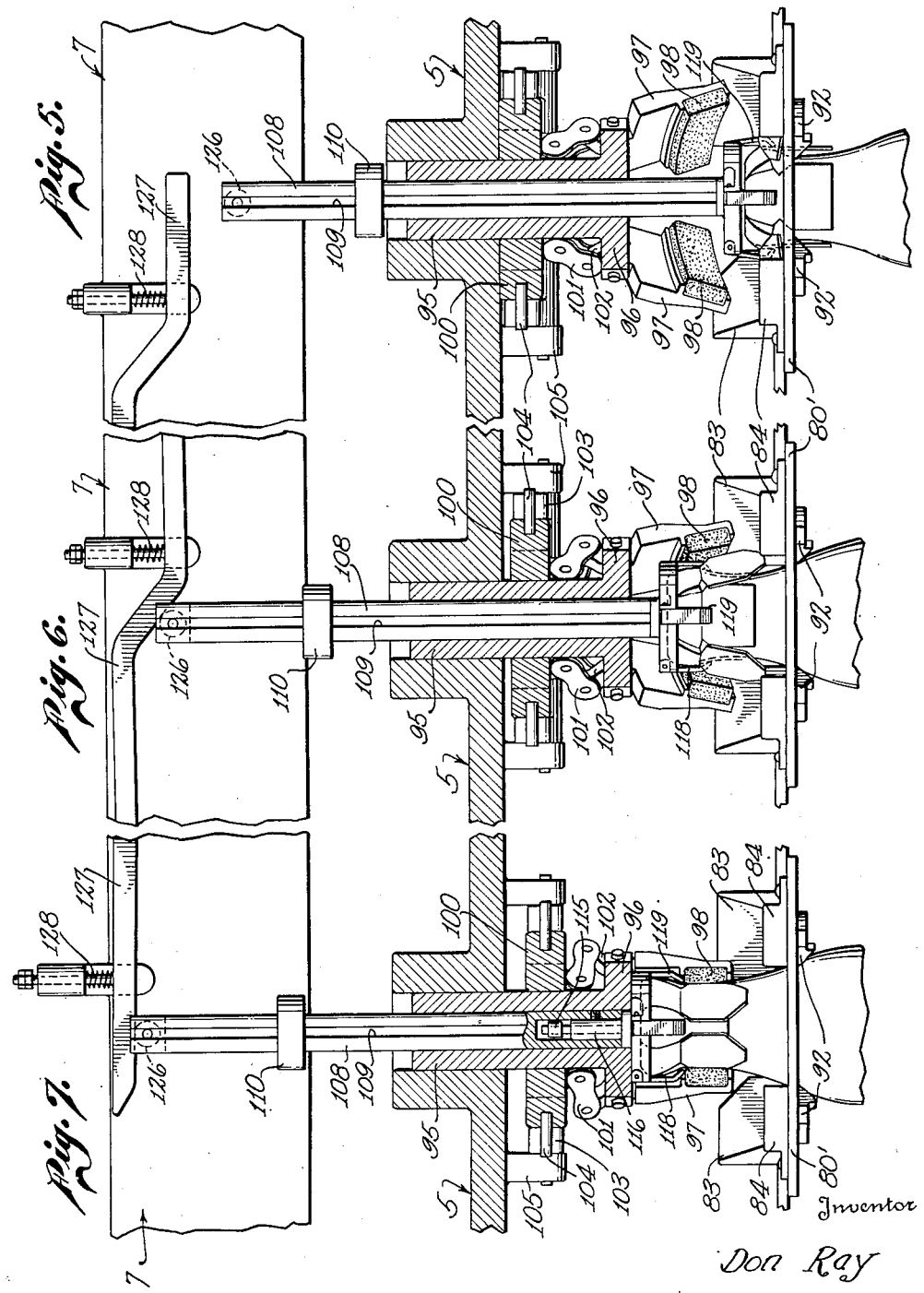

Inventor
Don Ray
By Lyon & Lyon
Attorneys

Inventor
Don Ray
By Lyon & Lyon
Attorneys

July 26, 1938.                    D. RAY                        2,124,674
                          BOTTLE HOODING MACHINE
                         Filed March 1, 1937          9 Sheets-Sheet 8

Inventor
Don Ray

By Lyon & Lyon
          Attorneys

Inventor
Don Ray
By Lyon & Lyon
Attorneys

Patented July 26, 1938

2,124,674

UNITED STATES PATENT OFFICE 2,124,674

BOTTLE HOODING MACHINE

Don Ray, Los Angeles, Calif.

Application March 1, 1937, Serial No. 128,382

16 Claims. (Cl. 226—80)

This invention relates to a machine for applying hoods adapted to cover the entire aperture or port, pouring lip and a portion of the neck of a wide mouth bottle of the type ordinarily used for milk, cream, buttermilk and similar dairy products, fruit juices and other foodstuffs and the like. The machine of this invention is particularly adapted to feed specially prepared blanks of material to a turret type of machine, the blanks being suitably treated immediately before they are positioned above the bottles to be hooded.

The hooding machine is characterized by its ability to handle bottles of different sizes and to accommodate itself to bottles varying not only in height but also in diameter so that variations of as much as ¼ inch in height or ⅛ inch or more in diameter (such variations being unavoidable in normal manufacturing operations) are automatically absorbed by the machine without in any way impairing or detracting from the formation of a completely enclosing, tight hood which protects the contents from contamination and simultaneously prevents the pouring lip or adjoining neck portions of the bottle from being contaminated during subsequent handling or shipment.

The application of crimped paper caps to bottles has been carried out in the past but the present machine distinguishes from such prior capping machines in that it does not apply a preformed cap but instead crimps and forms a complete hood over the upper portion of the bottle. Moreover, the machine of this invention applies the hoods to the bottles in a quick and effective manner so that the entire hooding operation may be made a part of the normal bottle filling and capping machines and run at a normal speed of from 60 to 180 bottles per minute.

A co-pending application, Serial No. 65,209, describes a preferred form of hood which may be applied to the bottles by the machine of this invention.

Generally stated, the present invention relates to a machine in which a stack of die-cut blanks is pneumatically fed upon a reciprocating two-stage feeder, the feeder first positioning the individual hood blanks above a suitable applicator or activator, and then feeding the activated blanks onto a positioning frame carried by a turret. The turret machine itself comprises a rotatable table provided with vertically movable supports, a head frame provided with suitable jaw members, and crimping fingers, and a centering or positioning frame carried between the head frame and the table. The table, head frame and centering frame are simultaneously rotatable. A stationary cam track holder is provided which actuates the jaw members or forming heads carried by the head frame. The cam track holder is provided with yieldable cam sections so that the forming heads may be caused to accommodate themselves to bottles of varying diameter or height. The centering frame is also provided with means for receiving and positioning a hood blank and for yieldingly receiving a bottle so that proper engagement between the bottle and the forming head automatically takes place even though the bottle is originally out of position. The machine of this invention also provides for means whereby the hood blanks are not activated or preliminarily treated in the event a bottle is not approaching the feeding device at the time. Automatic means for stopping the machine in the event a hood has been improperly formed is also provided.

An object of the present invention, therefore, is to disclose and provide an improved combination of elements whereby hoods may be applied to wide mouth bottles, said hoods extending over the port, lip and around the neck of the bottle.

Another object of the invention is to disclose and provide a turret type of hooding machine capable of forming hoods from precut blanks and applying said blanks to a bottle in a rapid and economical manner.

A further object of the invention is to disclose and provide a hooding machine capable of adjusting itself to variations in height and diameter of bottles.

A still further object of the invention is to disclose and provide improved means for feeding precut hood blanks to a hooding machine.

Another object of the invention is to disclose and provide specific arrangements and combinations of elements whereby hood blanks may be fed, activated, crimped and pressed into place around the neck of a bottle.

Still another object of the invention is to disclose and provide a simple and effective structure capable of performing and attaining the operations and results desired.

An object, also, is to disclose and provide new and improved means whereby the present hood blank is subjected to a preliminary folding and holding operation before it is pressed into place.

A still further object is to disclose and provide means for applying a volatile liquid medium to desired surfaces of a hood blank in a uniform and predetermined manner.

These and other objects, uses and advantages of the invention will become apparent to those skilled in the art from the following detailed description of one preferred embodiment of the invention. It is to be understood that in the appended drawings forming a part hereof an illustrative form of machine is shown in considerable detail but the invention is not limited to the specific form therein illustrated.

In the drawings:

Figs. 5, 6 and 7 illustrate in greater detail the positions of the bottles and forming heads during the formation of the hood around the neck of the bottle.

Fig. 9 is a side elevation showing the relationship of means for automatically terminating the operation of the machine in the event an imperfect hood has been formed.

Figure 1:
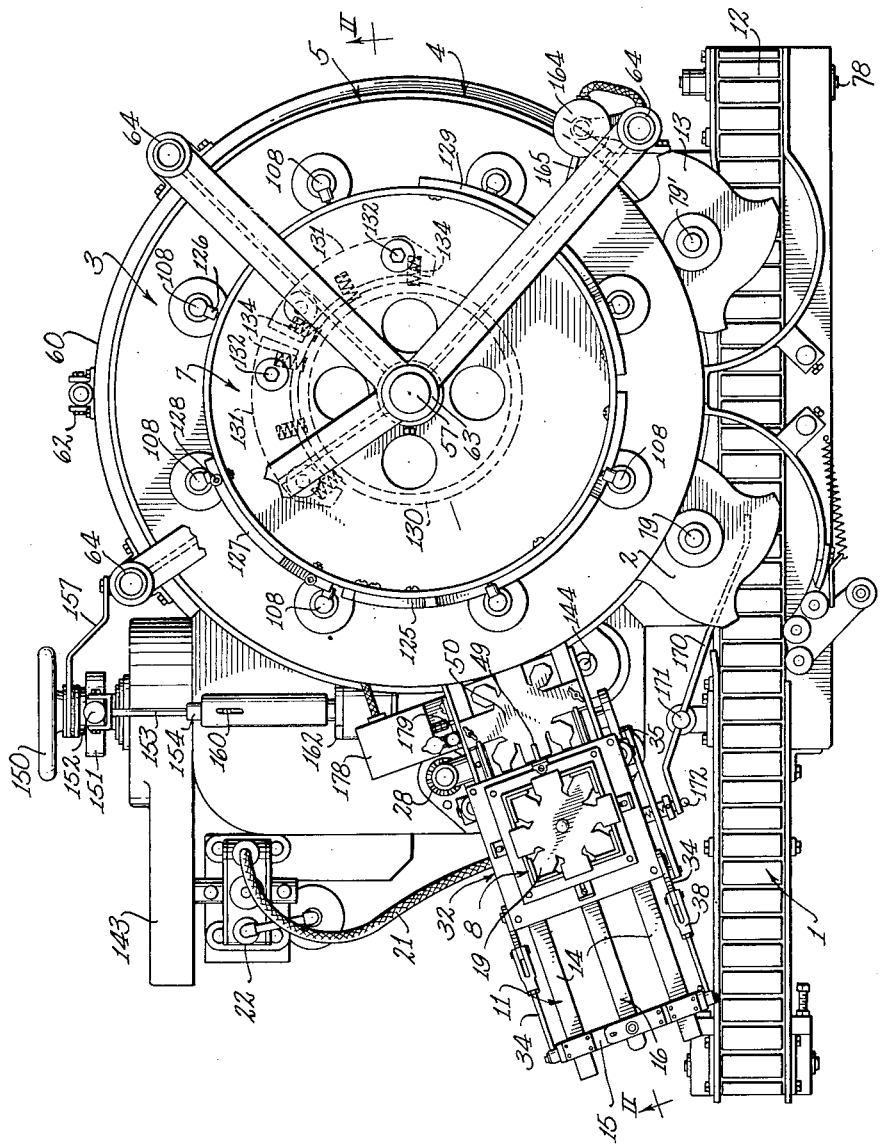
Fig. 1 is a plan view of the machine including feeding and discharge conveyors.

The primary units of the machine of this invention comprise a feeding conveyor 1 in cooperative relation with a feeding star wheel 2 adapted to feed bottles onto the turret machine, generally indicated at 3. This turret machine comprises as major elements a table 4, a head frame 5 and a centering frame 6, the table, head frame and centering frame being simultaneously revolvable about a vertical axis. Positioned above the head frame 5 is a stationary cam holder 7.

The turret machine 3 is also provided with a feeding, advancing and activating means including a stacking device 8, stripper means 9, activating means 10 and a reciprocable feeder 11, whereby precut hood blanks may be fed in activated form onto the centering and positioning frame 6. The completely hooded bottles are then discharged upon the portion 12 of the conveyor 1 with the assistance of the star wheel 13.

Figure 18:
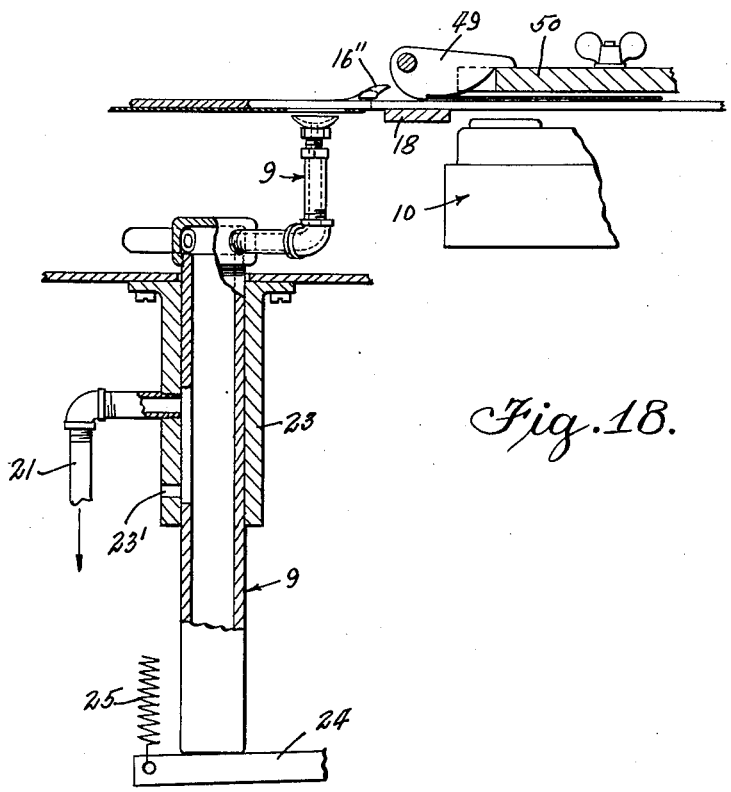
Fig. 18 is an enlarged vertical section taken along the plane XVIII—XVIII of Fig. 17.

The feeding, advancing and activating unit comprises a pair of fixed guide members 14 provided with a cross piece 15 slidably mounted thereon. The cross piece 15 is attached to a reciprocating carrier member 16 provided with a suitable backstop 17. The reciprocating member 16 is slidably supported upon transverse members, such as 18. Immediately above the reciprocating member 16 is a stack holder 8, provided with a plurality of upwardly extending pins at the lower end thereof, on which pins a stack of precut hood blanks, such as, for example, the blank 19 shown in Fig. 1, are supported. The stripping means 9 are positioned immediately below the stack 8 and comprise one or more suction lines or nipples supplied with vacuum from a line 21 connected to the suction side of a vacuum pump 22. In the embodiment shown, four suction nipples arranged in a square are connected to a central stripping line slidably mounted in a stationary sleeve 23. The suction nipples are movable upwardly between the guiding members 14 and the reciprocating carrier member 16. The suction line 21 is connected to the stripping line 9. The lower end of line 9 is provided with a plug and rests on the end of a lever 24 which is yieldably urged upwardly under the influence of spring 25. The sleeve 23 is provided with an outlet port 23' adapted to come into operative relation with a slot formed in the wall of pipe 9 within the sleeve 23 whenever the pipe 9 is at the bottom of its stroke, thereby permitting air to be drawn into the line 9 through the port in the sleeve 23 when the line 9 is at the bottom of its stroke (see Fig. 18).

Figure 3:
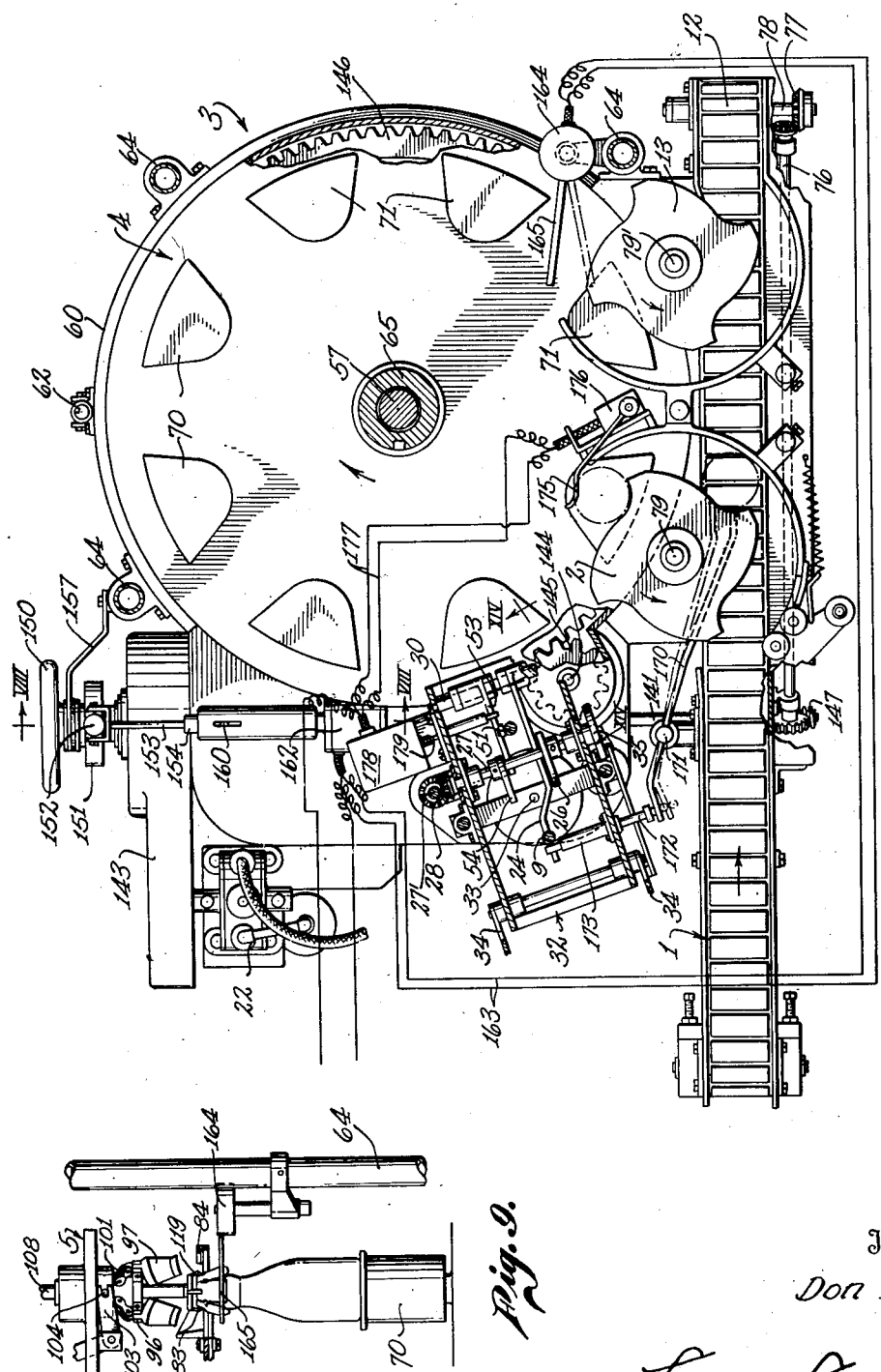
Fig. 3 is a horizontal section taken along the plane III—III of Fig. 2.

Reciprocation of the stripping pipe 9 is accomplished by means of the lever 24 which is actuated by means of a cam 26 mounted upon a transversely located shaft 27, which shaft is driven by means of the mitre gears 28 (Figs. 1 and 3). The cam 26 contacts with a roller 29 carried by the lever 24, the lever being pivoted upon a rocker shaft 30.

The means described hereinabove are contained within and are a part of a frame 32 which is selectively positionable vertically by means of a screw support 33. The mitre gear 28 is keyed upon a vertical shaft to permit continuous drive at various elevations of the frame 32.

During the operation of the machine, the stripper 9 is moved upwardly, suction being applied through the flexible pipe 21 and sleeve 23 to the interior of the pipe 9 through a suitable slotted aperture in the wall of the pipe 9. The end of stripping pipe 9 contacts with the lower edges of the precut hood blank 19 and pulls it downwardly onto the carrier 16, the edges of the blank 19 resting upon stationary horizontal guide members 14. As the stripping pipe 9 reaches the lower portion of its travel, air is admitted into the stripping pipe 9 through the port 23' in the wall of sleeve 23, thereby releasing the blank 19 from the stripping pipe 9.

The crosshead 15 is then actuated by means of a suitable linkage, indicated at 34, leading to a crank 35 carried by one end of the drive shaft 27. The travel of the carriage 16 may be regulated by adjusting the throw of the crank 35 and by varying the length of the linkage as by means shown at 38.

Figure 10:
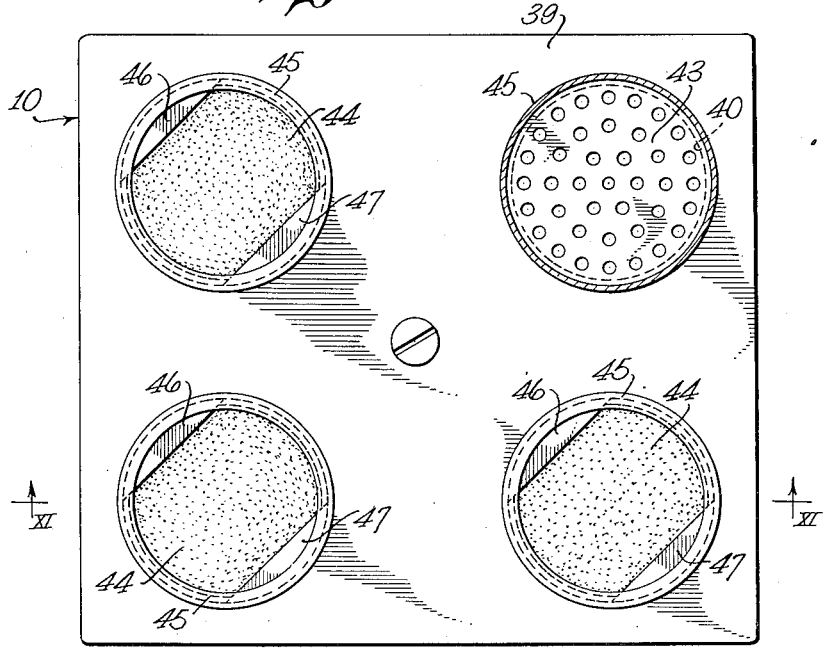
Fig. 10 is a plan view of the applicator.
Figure 11:
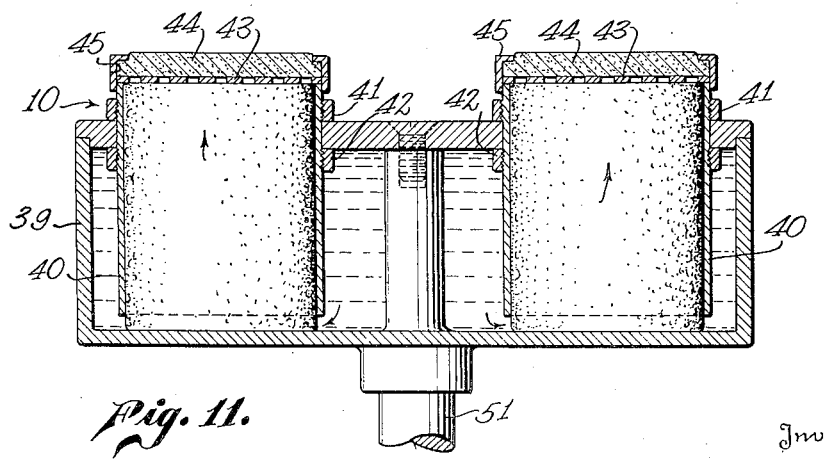
Fig. 11 is a vertical section taken through a portion of the applicator taken along the plane XI—XI of Fig. 10.

Between the stack 8 and the centering frame 6 of the turret machine 3, and principally below the level of the carriage 16, is an applicator or activating unit shown in more detail in Figs. 10 and 11 and generally identified by the number 10. This applicator unit comprises a receptacle 39 provided with four circular holes in the upper case. Extending through said holes or ports are cylindrical members 40 externally threaded so as to permit vertical adjustment of the cylinders 40 by means of internally threaded locking rings 41 and 42, the edges of said rings being adapted to contact with the cover of the housing 39. Carried upon the top of each of said cylinders is a perforated plate 43 which is then covered with a piece of felt or other absorbent material 44. The plate and felt are maintained in position by means of a locking ring 45 having an inwardly extending flange, said inwardly extending flange also assisting in retaining in position certain blocking or masking members, such as the members 46 and 47.

The interior of the housing 39 is filled with a suitable activating liquid or solvent. The cylinders 40 are preferably filled with a carefully prepared, precut filler of felt or other wick-like absorbent material adapted to produce the necessary capillary feeding of the liquid to the outer surface of the felt 44.

The traveling carriage member 16 of the two stage feeder is provided with a pair of dogs 16' and 16'' adapted to engage the edges of precut hood blanks. The stripping means 9 place a blank upon the carriage member 16 immediately in front of the dog 16' and during its reciprocating travel the carriage 16 places such blank in position above the activator 10 and immediately below a pressure plate 50. During the return stroke the hood blank so left in position above the activator 10 is prevented from moving back toward the stacker 8 by reason of a latch member 49. The activator 10 is mounted upon a vertically movable rod 51 slidably mounted in a guide member 52. The lower end of the supporting rod 51 is provided with a roller resting against a lever arm 53 pivotally mounted upon the rocker shaft 30. The lever 53 is actuated by means of a cam 54 which periodically comes into engagement with a roller carried by the free end of the lever 53, the cam 54 being mounted upon the drive shaft 27. The lever 53 is yieldably and upwardly urged by a spring 55.

It is to be understood that while the stripping means 9 are removing a hood blank from the stack 8 and placing it upon the traveling carriage 16, the activator 10 is applying the activating fluid to another previously stripped hood blank. During this period of time the carriage 16 may be moving away from the centering frame 6. Thereafter the traveling carriage 16 moves toward the centering frame 6, the dog 16'' engaging the activated hood blank and placing the activated hood blank upon the centering frame. The carriages 16 and 16' thereof are simultaneously advancing another or newly stripped hood blank into position beneath the pressure plate 50 for activation by the activator 10.

The turret machine referred to previously herein includes a vertical shaft 57 supported at its lower end by means of a transversely extending lever 58 pivotally connected to the end of the shaft 57 as by means of the pin 59 extending through the bifurcated end portion thereof. The lever 58 is pivoted to the base frame 60 of the machine at one side thereof, the opposite end of the lever being attached to a vertical shaft, the upper section of said shaft being externally threaded and extending through a box 62 fastened to the frame 60. Above the box 62 the vertical externally threaded portion carries a handwheel whereby the lever 58 may be raised or lowered, thereby raising or lowering the vertically positioned shaft 57. The upper end of the shaft 57 extends through a guide 63 supported from side pillars 64.

The lower section of the shaft 57 is surrounded with a driven sleeve 65 which forms a part of the rotatable table 4. Vertically adjustable upon the sleeve 65 and keyed thereto is a head frame 5 which preferably is supported from a boss flange 66 formed or carried by the shaft 57 and provided with suitable bearings. The head frame 5 may also be provided with an outwardly extending flange portion 67 from which the centering frame 6 is adjustably suspended as, for example, by means of the screw bolts 68. Above the head frame 5 the shaft 57 is provided with a stationary cam frame 7.

Figure 4:
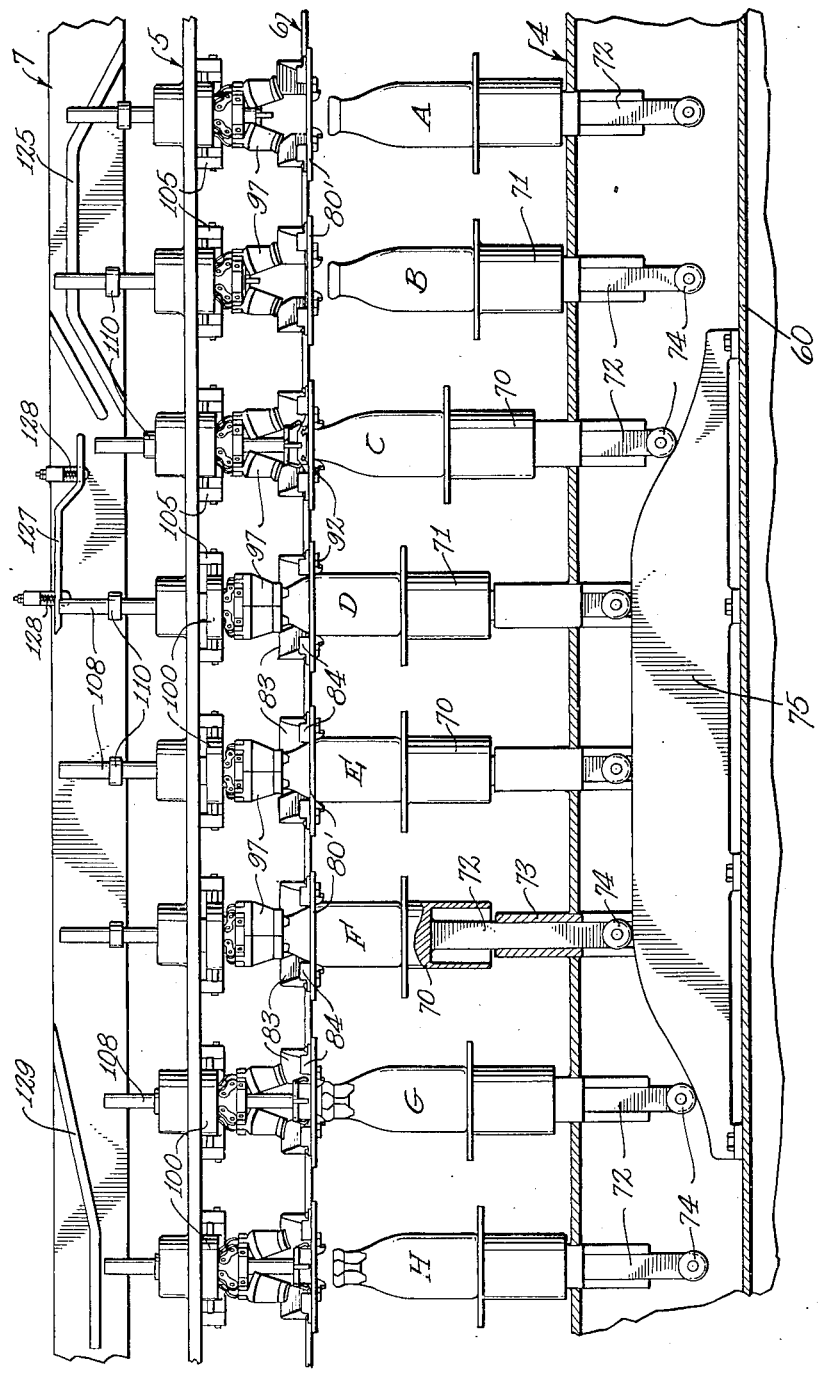
Fig. 4 is a partly diagrammatic representation, in side elevation, of a development of the turret portion of the machine.

The rotatable table 4 is provided with a plurality of vertically movable supports such as the supports 70 and 71. As more specifically shown in the development (Fig. 4), these vertically movable supports 70 and 71 are mounted upon vertically movable members 72 slidably mounted in fixed slides 73 carried by the table 4. The lower ends of the members 72 are provided with rollers 74 which, during their travel with the table 4, may come in contact with a fixed cam 75 attached to and forming a part of the stationary base 60 of the machine.

Bottles are fed to this machine by means of the continuous conveyor 1 driven in a suitable manner as, for example, by means of a countershaft 76, mitre gears 77 and gear shaft 78. The bottles are fed to the machine in timed relation and suitably spaced by means of a star wheel 2 driven by a shaft 79 and gearing 80 (see Fig. 2). The properly hooded bottles are removed from the rotatable table 4 by a similar star wheel 13 driven by a shaft 79' and interlocked gearing.

Figure 12:
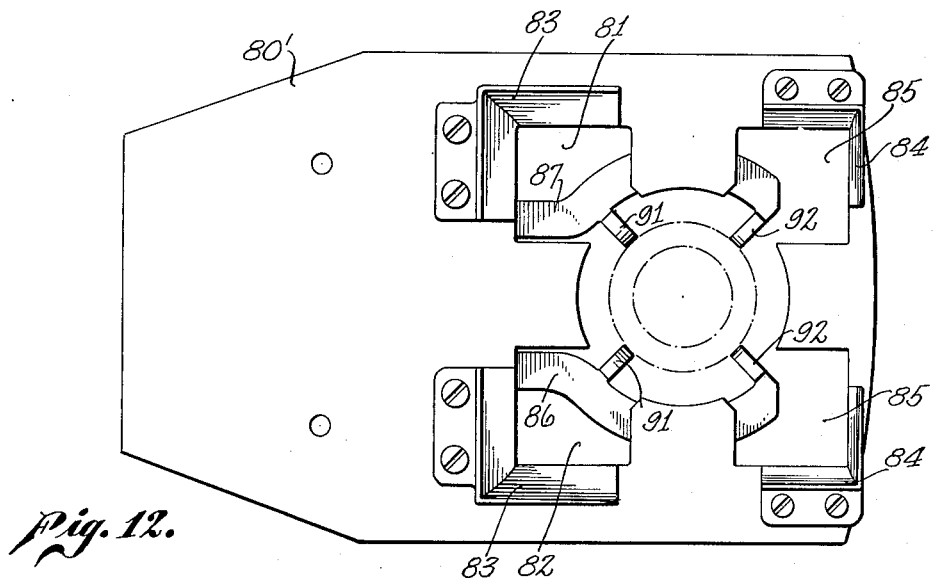
Figs. 12 and 13 are plan and bottom views respectively of a positioning and guiding head carried by the centering frame.
Figure 13:
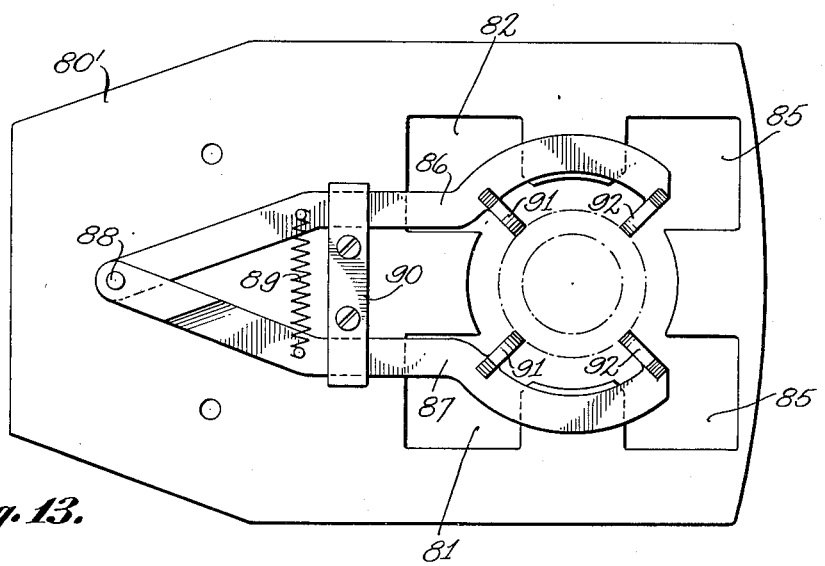
Figure 17:
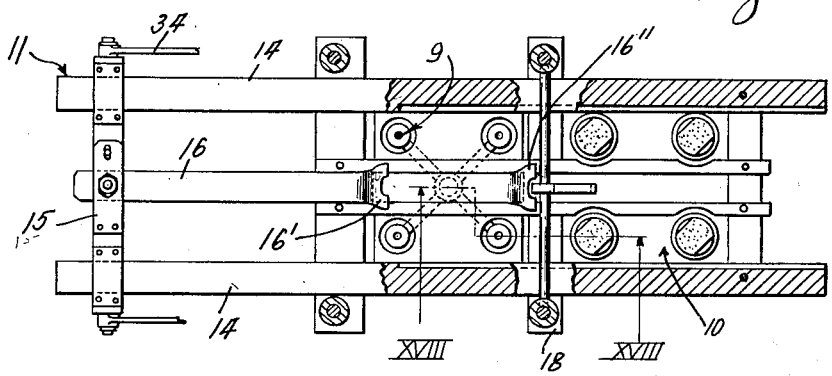
Fig. 17 is an enlarged view, partly broken away, of the two stage feeder.

The centering and positioning frame 6 is provided with a plurality of means for receiving and positioning a hood blank, each of said means being more particularly shown in Figs. 12 and 13. Each of said means may include, for example, a plate 80' provided with openings corresponding to the position which would be occupied by the activated areas of a hood blank adapted to be received by said plate 80'. In order to properly position the hood blank with respect to said aperture, such as the apertures 81 and 82, stop members 83 are provided, these stop members including upwardly and outwardly inclined inner faces which tend to accurately position the corners of the hood blank. The outer edge of the plate 80' is similarly provided with stop members 84 so as to further insure the accurate positioning of the hood blank with respect to the apertures 85 formed in the plate 80'.

Attached to the lower side of the plate 80', as shown in Fig. 13, are centering means which may include a pair of opposing arms 86 and 87 pivoted as at 88 and yieldably urged together as by means of the spring 89, said arms being maintained in a substantially horizontal plane by means of a retainer 90. Extending inwardly from the curved outer ends of the arms 86 and 87 is a plurality of fingers 91 and 92 which are preferably provided with upwardly and inwardly curving or slanting bottom surfaces adapted to contact with the exterior surface of the bottle. It is to be remembered that a centering and positioning device of the character shown in Figs. 12 and 13 is carried by the centering frame 6 immediately above each of the vertically movable supports 70 and 71.

Above the centering frame 6 the head frame 5 is provided with a plurality of forming heads. Each of said forming heads includes a sleeve 95 fixed to said head frame and provided with an outwardly extending flange 96 at its lower end. A plurality of jaw members (four in number in the preferred embodiment) are pivotally carried by the flange 96 of the sleeve 95. Each of said jaw members, such as the jaw member 97, is preferably in the form of a bell crank, the lower arm of which is curved so as to conform with the contour of the bottle below the lip thereof. Furthermore, each of said jaw members 97 carries on its inner and lower face an elastic pad or member 98 adapted to uniformly distribute the clamping pressure over the exterior of the bottle. Preferably the plurality of jaw members 97 comprising the forming head are of such width that in clamped position they virtually completely encircle the bottle.

Slidably mounted on the sleeve 95 is a ring 100, said ring 100 being coupled as by means of links 101 with the stub arms 102 of the jaw members 97. The ring 100 is moved along the sleeve 95 by means of a yoke or lever 103 provided with bifurcated ends adapted to engage with pins 104 extending over the ring 100. The yoke or lever 103 is pivoted at the end opposed to the bifurcations in lugs 105 extending downwardly from the head frame 5.

The yoke or lever 103 is preferably made integral with an upstanding member 106 provided with a roller at its upper end, said roller being adapted to contact with suitable cams carried by the cam frame 7. Ordinarily, the ring 100 is maintained in raised position and the jaws 97 in open position by reason of a spring 107 which urges the member 106 toward the center of the machine, as shown more particularly in Fig. 2.

Slidably mounted within the sleeve 95 is a rod 108 provided with means for preventing rotation of the rod in the bore of said sleeve 95, such as, for example, the keyway 109. The rod 108 is provided with a stop member 110 which limits the downward travel of the rod.

Figure 15:
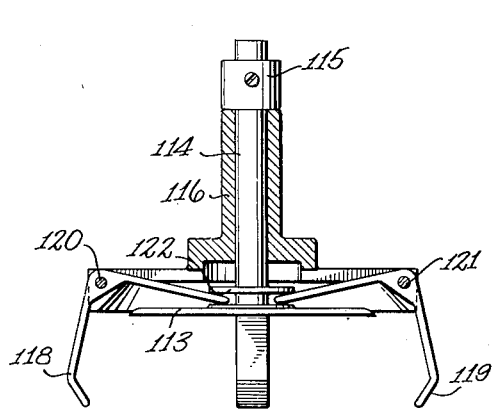
Figs. 15 and 16 are enlarged views of crimping heads carried by the forming heads.
Figure 16:
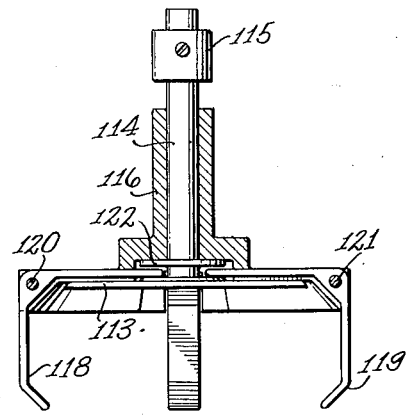

Crimping means are carried by the lower end of the rod 108, such crimping means being shown with greater particularity in Figs. 7, 15 and 16. As there shown, such means may comprise a presser head 113 carried by the lower end of a rod 114 extending into a cavity formed in the lower end of the rod 108 and held therein by means of an adjustable stop 115. As shown in the drawings, the rod 114 is actually slidably mounted in a sleeve member 116 which is then locked within said cavity by means of a set screw, as shown in Fig. 7. The sleeve member 116 may be provided with an outwardly extending lower flange, said flange carrying a plurality of bell crank shaped crimping fingers, such as the fingers 118 and 119 pivoted as at 120 and 121, the inwardly extending arms of said crimping fingers engaging with a collar 122 carried by the stem 114 of the presser plate 113. The lower points of the crimping fingers 118 and 119, when no upward pressure is directed against the presser plate 113, should preferably be spaced a distance which is substantially equal to the outer diameter of the lip of the bottle to which the hood is to be applied. This adjustment is attained by adjustably positioning the stop 115 on the stem 114. The length of the downwardly extending crimping fingers 118 and 119 and the internal contour of the flange on which the crimping fingers are pivoted should approximately correspond to the shape and contour of the lip or upper section of the bottle to which the hood is applied so that when the head of a bottle enters between the extended crimping fingers 118 and 119 shown in Fig. 15 and the top of the bottle presses against the plate 113, whereby said plate and fingers assume the position shown in Fig. 16, the fingers contact with the lip and extend beneath the lip of the bottle.

The cam track holder 7 is provided with stationary cam means 125 which are provided with downwardly extending end portions adapted to get under the roller 126 carried by the upper end of the vertically movable rod 108. The fixed cam 125 is positioned at points between the feed star wheel 2 and the point at which the precut blanks are fed onto the centering frame.

The stationary cam track holder 7 is also provided with a vertically yieldable cam 127 mounted on a spring suspension, as indicated at 128, so that when the vertically movable supports 71 are raised, causing the head of the bottle to enter the forming head and elevate the rod 108 by contact with the pressure plate 113, a positive crimping pressure will be exerted upon the blank through the crimping fingers 118 and 119 and variations in height of the bottle will be compensated for and accommodated by the spring suspension 128 of the trackway 127. At a suitable point on the periphery of the cam track holder 7 another camway 129 may be provided for the purpose of assuring suitable downward movement of the rod members 108 to a position in which proper crimping of subsequently applied blanks can take place. The trackway 129 is directed downwardly at a gentle slope to a position immediately above the position assumed by the rod 108.

Figure 2:
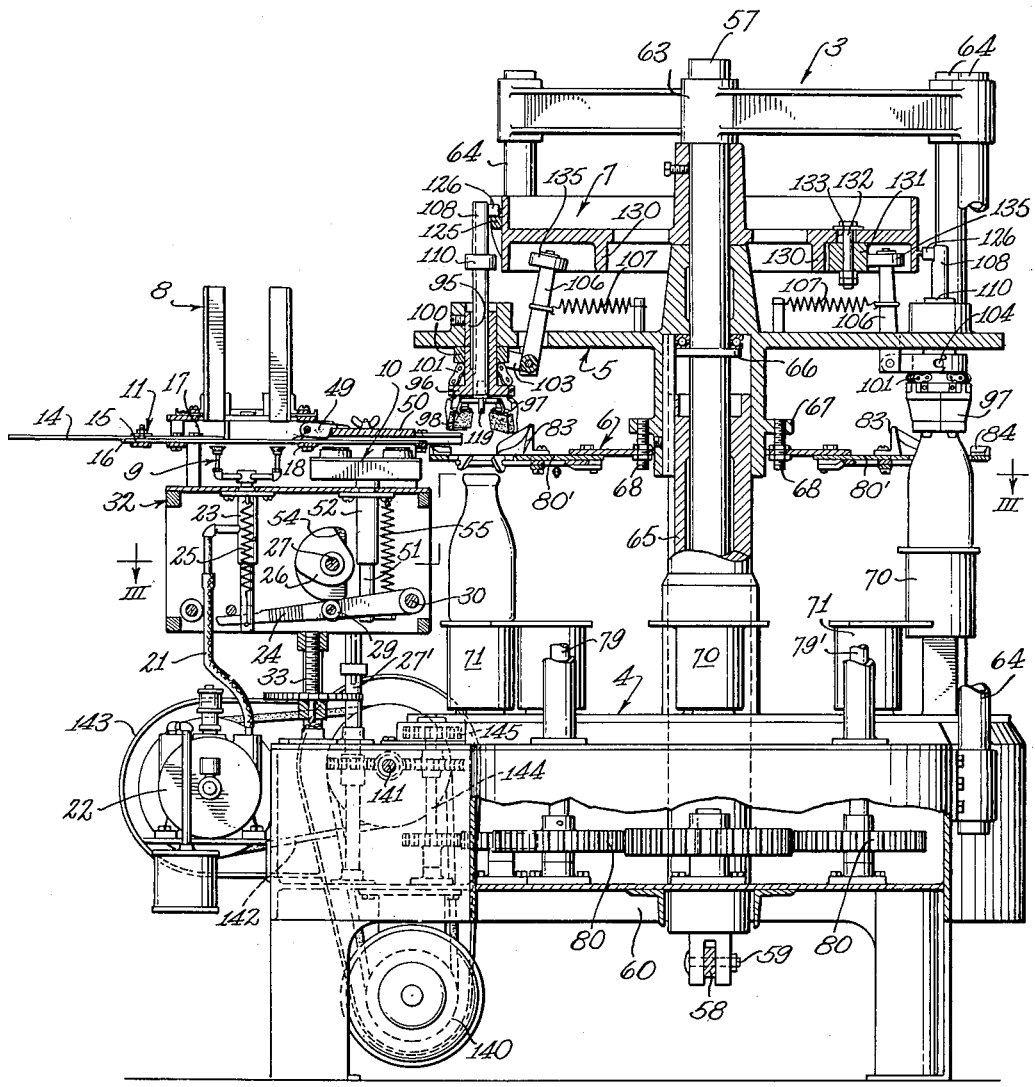
Fig. 2 is a vertical section taken along the plane II—II of Fig. 1.

On the internal surfaces of a downwardly extending flange 130 carried by the track holder 7 is a cam 131 (see Figs. 1 and 2). The cam 131 may be made of one or more sections and is movably supported from the holder 7 by means of bolts 132 movable radially in slots 133. Spring means 134 are provided, said spring means extending into cavities formed in the rear surface of the cam 131 and bearing against the downwardly extending flange 130, said spring means yieldably urging the cam 131 outwardly. The cam 131 is adapted to contact with a roller 135 carried by the upper end of bell crank lever 106. In the event the neck of the bottle being hooded is of appreciably larger diameter than the average, then the resistance offered by such unusually large bottle head will be absorbed by movement of the cam 131 toward the center of the machine.

The machine is driven preferably from a single source of power, such as the motor 140, which may be suitably mounted beneath the machine and attached to the frame 60 thereof. Such motor may drive a shaft 141 from which power is taken as by means of belt 142 to drive the vacuum pump 22. The belt 142 may be enclosed in the housing 143, shown in Figs. 1 and 3. The drive shaft 141 then drives by suitable worm gearing the vertically extending shaft 27', which then drives the cam shaft 27. In Fig. 2, for purposes of clarity, the vertically extending shaft is shown slightly displaced from the axis of the shaft 27.

Figure 14:
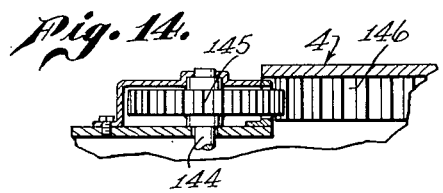
Fig. 14 is a partial vertical section taken along the plane XIV—XIV of Fig. 3.

The shaft 141 also drives the counter shaft 144 which, as shown in Fig. 14, is provided with a spur gear 145 which drives a gear 146 attached to and forming a part of the rotatable table 4. The lower end of shaft 144 is provided with a suitable train of gearing including the gears 80 for driving the star wheels 2 and 13. The shaft 141 also carries at its outer extremity a worm gear 147 adapted to drive a counter shaft 76 through which power is supplied to the shaft 78 by mitre gears 77 and the conveyor 1 driven thereby.

Figure 8:
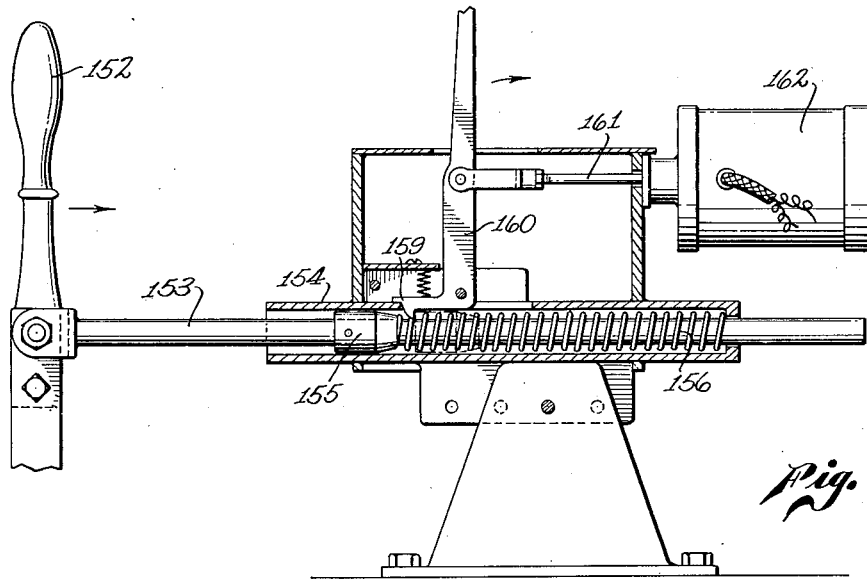
Fig. 8 is a vertical section taken along the plane VIII—VIII of Fig. 3.

The opposite end of the shaft 141 may be provided with a hand wheel 150 to manually rotate the machine for adjustment purposes, etc. A manually operated clutch 151 is also introduced in said shaft, such clutch being operable by means of the lever 152. Means are also provided for automatically stopping the machine in the event an imperfectly formed hood has resulted from the operation of the machine. Such means for automatically stopping are illustrated in Figs. 3, 8 and 9 and comprise a rod 153 attached to the handle 152 and extending into a housing 154, the rod 153 being provided with a dog 155. A compression spring 156 is contained in the housing 154 and rests against the dog 155, tending to move the rod 153 and the lever 152 in such manner as to disengage the clutch 151. In disengaged position the driven portion of the clutch is brought in contact with a stationary annular member surrounding the shaft 141 and held in position by means of a member 157 as shown in Fig. 3, thereby exerting a braking action upon the driven shaft.

When the clutch is engaged, the lever 152 is moved in the direction of the arrow (Fig. 8) so as to cause the dog 155 to engage a latch member 159 forming a part of a bell crank lever 160. The bell crank lever is connected by means of link 161 with a solenoid or similar electrical device 162. This solenoid 162 is connected as by leads 163 with contact points within a housing 164, one of said contact points being movable with respect to the other, said movable contact point being mounted upon a finger 165. The finger 165 is rotatable about a vertical axis in a plane immediately above the top of the bottles being discharged from the rotatable table 4, as more particularly shown in Fig. 9. In the event a hood has not been properly formed about a bottle and instead has been lifted off the bottle, as indicated in Fig. 9, so that an improperly hooded bottle is being discharged by the machine, then the finger 165 will contact with the improperly placed or suspended hood, closing the electrical circuit involving leads 163, thereby energizing solenoid 162, causing the bell crank lever 160 to move in the direction of the arrow (Fig. 8), thereby releasing the dog 155 and permitting the spring 156 to force the handle 152 back into that position in which the clutch is disengaged and the driven shaft braked against the member held by the arm 157.

Means are also provided for discontinuing the operation of the stripper 9 and the activator 10 in the event the feed of bottles to the turret 4 is interrupted. Such means include a spring activated arm 170 on a vertical pivot pin 171, the outer end of said arm being adapted to contact with bottles as they are fed off the conveyor by the feeding star wheel 2. The other arm of the lever 170 is attached to a reciprocable latch member 172 which is normally provided with spring means within the sleeve 173 tending to hold the end of the latch 172 in locking position above the tip of arm 24 as shown in Figs. 2 and 3. Obviously when the latch 172 hold the arm 24 down, vertical motion can not be imparted to the stripping means 9. If, however, a bottle is fed from the conveyor 1 by the star wheel 2, it comes in contact with the outer end of arm 170 and pivotal motion of said arm takes place, releasing arm 24 and permitting vertical reciprocation of the stripping means 9.

Similar means for discontinuing the operation of the activator 10 are provided, such means including a pivotally mounted contact arm 175 adapted to contact bottles after they are placed upon the rotatable table 4 and before they are moved into position to receive a precut blank. This arm 175 will close a suitable contact within the contact box 176 when a bottle is carried past the arm 175 on the vertically movable support 70, thus closing a circuit embracing leads 177 and energizing a solenoid 178 which causes a latch member 179 to be withdrawn, liberating the arm 53 for upward movement. Arm 53 imparts vertical movement to the member 51 on which the activator 10 is mounted. If a bottle does not pass the spring or arm 175, then the activator 10 is retained in its lowered position by reason of the latch member 179 resting upon the arm 53.

In actual operation of the machine described, the position or elevation of the forming head frame 5 is adjusted by means of the lever 58, secondary adjustment of the centering frame 6 being accomplished by manipulation of the lock nuts on the bolts 68. Adjustment of the centering frame relative to the forming head may be needed and is desirable whenever the size or length of tabs of the precut hood blanks is varied, thereby assuring proper coordination between the crimping head and the hood blank when the bottle is moved upwardly through the centering frame. The cam holder 7 is lowered into the required position and fastened onto the vertical shaft 57. Filled and capped bottles are then fed by the conveyor 1 toward the star wheel 2 which feeds the bottles in suitably spaced and timed relation onto the vertically movable supports 70 and 71. The stripping means 9 removes precut hood blanks from the stack 8, advances them into position beneath the pressure plate 50 and above the activating unit 10, and desired portions of the under side of such hood blanks are activated by reason of contact between the felt surfaces 44 and areas of the under surface of the blanks, such areas being limited by the members 46 which de-limit the effective areas of the felt 44.

The stripping means 9 and the activator 10 are released for operation by means of the arms 170 and 175, as described hereinabove, said arms releasing the latch members 172 and 179 respectively. When a constant stream of bottles is being fed to the rotatable table 4, both the stripping means and the activating means 10 are in operation. In the event that the feed of bottles is discontinued, however, the arm 170 first locks the stripping means 9 so that additional blanks are not fed to the activator. A blank is activated, however, for the bottle that is in engagement with the arm 175. After this bottle has had an activated precut hood blank applied thereto, the activator is locked and rendered inactive since the arm 175 is not deflected by further bottles.

After the blank has been placed upon the centering and positioning devices carried by the frame 6, the supporting element 71 is raised by reason of contact between the roller 74 and the cam 75. By referring to Fig. 4, it will be seen that a bottle, when in contact with the member 175, occupies position A. In position B the bottle is in front of the feeding and activating means and an activated blank has been positioned within the centering frame 80'. In position C the bottle is partly raised and the rod-like member 108 has been released into downward position by the trackway 125. In position C it will be seen that the prongs or arms of the crimping head are beginning to crimp the precut hood blank into suitable form around the lip of the bottle. In position D, the bottle has been raised to its maximum position, the jaws 97 tightly enclosing the entire head of the bottle.

During the movement of the bottle from C to D, the crimping operation is shown in greater detail in Figs. 5, 6 and 7. It will be noted that the crimping fingers 118 and 119, four in number, depress spaced portions of the blank and cause said portions to closely conform with the outer surface of the bottle. Inward pressure of these fingers 118 and 119 is partly caused by the upward pressure of the bottle against the presser plate 113, upward movement of such presser plate causing an inward movement of the crimping fingers 118 and 119. Thereafter the head of the bottle moves into the position shown in Fig. 7, whereas the jaws 97 encircle the bottle at points below the lip thereof, causing the tabs to form a substantially smooth, adherent membrane completely around the bottle. The elastic pads 98 conform with any major irregularity in the neck of the bottle, these pads 98 being below the position occupied by the crimping fingers 118 and 119.

As the bottle is moved from position D to positions E and F, constant pressure is maintained around the neck of the bottle. The activated end sections of the hood blank are thereby caused to tenaciously adhere to the under tabs previously folded around the bottle by the crimping fingers 118 and 119. After reaching position F, the vertically movable support begins to lower so as to withdraw the bottle from the jaws. Simultaneously, the jaws release or open so that after passing through position G, the bottle assumes the position shown in H, whereupon it is ready to be discharged by the star wheel 13. Immediately before such discharge, however, the bottle passes beneath the arm 165 which makes certain that the hood has been properly applied. If the hood has been improperly applied, for example, as shown in Fig. 9, then the entire machine is stopped almost instantaneously.

Attention is called to the fact that the centering and positioning means mounted upon the removable plates 80', which are in turn attached to the frame 6, include the arms 86 and 87. These arms contact with the lip of the bottle as it is moved upwardly by means of the vertically movable supports 70 and 71 and then contact with the neck and body of the bottle, centering the bottle with respect to the hood blank which rests on the inwardly extending finger portions of the member 80' between apertures 81, 82, 85, etc. These apertures are provided so that the adhesive or activated portions of the hood blank do not contact with any portion of the centering frame. As has been pointed out hereinbefore, the upwardly and outwardly inclined stop members 83 and 84 receive the hood blank and properly position it upon the inwardly extending fingers of the member 80.

The preferred type of hood blank is described in a co-pending application of Berch, Ray and Chase, Serial No. 117,022. As there more fully described, the preferred hood blank is provided with a relatively large central portion provided with eight outwardly extending tabs, alternate tabs being slightly shorter than the intermediate tabs. The shorter tabs constitute the under portions, the longer tabs covering them when the hood blank is formed around the entire head, lip and neck of the bottle. The under portions of the longer tabs are the ones which are activated by the activator 10. The hood blank itself is preferably made of a tag board properly coated with a resinous, waterproof, flexible, elastic substance capable of becoming adhesive when brought in contact with suitable solvents or activators. The housing 39 of the activator 10 contains this liquid solvent, which is then fed upwardly through the packing within the cylinders 40 to the felt 44. Vertical adjustment of the cylinders 40 in the surfaces of the felt 44 is accomplished by adjusting the internally threaded rings 41 and 42 as described hereinabove.

It is to be understood that the present invention is not limited to the use of the particular hood described in said co-pending application although it is eminently suited for its rapid application to bottles.

I claim:

1. In a bottle hooding machine of the turret type: a rotatable table provided with a plurality of vertically movable supports, a centrally positioned post, a rotatable head frame journaled on said post above said table, a centering frame positioned between said head frame and table and rotatable with said head frame, means for adjustably positioning the head frame and centering frame above said table and relatively to each other, a stationary cam track holder above said head frame, a plurality of forming heads carried by the head frame in peripherally spaced relation and above each of said vertically movable supports, each of said forming heads including a sleeve, jaw members pivotally connected to the lower end of said sleeve, a ring slidable on said sleeve, links connecting said ring and jaw members, lever means carried by the head frame and engageable with said ring to actuate the said jaw members, and yieldable cam means carried by the cam track holder and adapted to engage with said lever means for yieldably closing said jaws.

2. In a bottle hooding machine of the turret type, a rotatable head frame provided with a plurality of forming heads in peripherally spaced relation, each of said forming heads including a vertically disposed sleeve provided with an outwardly extending flange at its lower end, a plurality of jaw members of bell crank form pivotally mounted on the lower end of said sleeve, a ring slidable on said sleeve, links connecting said ring and jaw members, lever means carried by the head frame and engageable with said ring to actuate said jaw members, and elastic pads carried by the inner surfaces of said jaw members whereby yieldable contact between said jaws and a bottle is effected.

3. In an apparatus of the character described in claim 2, the provision of means adapted to cooperate with said lever means to actuate said jaws, a rod slidably mounted within said sleeve, means for preventing rotation of said rod, a vertically movable presser head carried by the lower end of said rod, and a plurality of crimping fingers of bell crank form pivotally carried by the lower end of said rod, the inwardly extending arms of said crimping fingers being in operable engagement with said vertically movable presser head.

4. In an apparatus of the character defined in claim 2, the provision of means adapted to cooperate with said lever means to actuate said jaws, a rod slidably mounted within said sleeve, means for preventing rotation of said rod, a vertically movable presser head carried by the lower end of said rod, a plurality of crimping fingers of bell crank form pivotally carried by the lower end of said rod, the inwardly extending arms of said crimping fingers being in operable engagement with said vertically movable presser head, means for raising said rod and crimping means, and separate means for yieldably resisting upward movement of said rod.

5. In a bottle hooding machine of the turret type, the combination of: a rotatable head frame, a stationary cam track holder above said head frame, a plurality of forming heads carried by the head frame in peripherally spaced relation, each of said forming heads including a vertically extending sleeve, jaw members pivotally connected to the lower end of said sleeve, a ring slidable on said sleeve, links connecting said ring and jaw members, and lever means carried by the head frame and engageable with said ring to actuate said jaw members; and radially yieldable cam means carried by the cam track holder and engageable with said lever means for yieldably closing said jaws during a portion of the travel of said head frame.

6. In a bottle hooding machine of the character defined in claim 5, the provision of a rod slidably mounted within said vertically extending sleeve, means for preventing rotation of said rod, a vertically movable presser head carried by the lower end of said rod, bell crank crimping fingers pivotally carried by the lower end of said rod, the inwardly extending arms of said crimping fingers being in operable engagement with said vertically movable presser head, and vertically yieldable cam means carried by said cam track holder and adapted to cooperatively engage the upper end of said slidable rod.

7. In a bottle hooding machine of the turret type, including a rotatable table provided with vertically movable peripherally spaced supports, the combination of: a centering and positioning frame rotatably mounted above said table, means for rotating said frame and table simultaneously, a plurality of hood blank receiving means carried by said centering frame in peripherally spaced relation, each of said hood blank receiving means being positioned above a vertically movable support on said table; each of said hood blank receiving means including inwardly extending fingers adapted to support a hood blank, and upwardly and outwardly inclined stop means in operative relation with said inwardly extending fingers for guiding a hood blank into position on said fingers.

8. In an apparatus of the character defined in claim 7, the provision of means for yieldingly receiving a bottle carried by said centering frame in operative relation with each of said hood blank receiving means, each of said bottle receiving means comprising a pair of spring-actuated arms having fingers adapted to contact with the surface of a bottle.

9. In a bottle hooding machine of the turret type, the combination of: a rotatable head frame, a plurality of forming heads carried by the head frame in peripherally spaced relation, each of said forming heads including a sleeve, jaw members pivotally connected to the lower end of said sleeve, elastic pads carried by the inner surfaces of said jaws, a ring slidable on said sleeve, links connecting said ring and jaw members, lever means carried by the head frame and engageable with said ring to actuate said jaw members, a centering frame positioned below said head frame and rotatable therewith, means for adjustably positioning said centering frame with respect to said head frame, means carried by the centering frame for accurately positioning bottle hood blanks thereon, and means carried by the centering frame for yieldingly receiving a bottle and guiding the same into said forming heads, each of said bottle guiding means comprising a pair of arms yieldably urged together and operating in a horizontal plane, each of said arms being provided with inwardly extending curved fingers adapted to contact with the surface of a bottle.

10. In a bottle hooding machine of the turret type, the combination of: a rotatable head frame, a plurality of forming heads carried by the head frame in peripherally spaced relation, each of said forming heads including a sleeve, jaw members pivotally connected to the lower end of said sleeve, elastic pads carried by the inner surfaces of said jaws, a ring slidable on said sleeve, links connecting said ring and jaw members, lever means carried by the head frame and engageable with said ring to actuate said jaw members, a centering frame positioned below said head frame and rotatable therewith, means for adjustably positioning said centering frame with respect to said head frame, means carried by the centering frame for accurately positioning bottle hood blanks thereon, means carried by the centering frame for yieldingly receiving a bottle and guiding the same into said forming heads, each of said bottle guiding means comprising a pair of arms yieldably urged together and operating in a horizontal plane, each of said arms being provided with inwardly extending curved fingers adapted to contact with the surface of a bottle, a stationary cam track holder positioned above said head frame, and a radially yieldable cam carried by said holder and adapted to engage with lever means for yieldably closing said jaws.

11. In a bottle hooding machine of the turret type, including a rotatable table provided with vertically movable peripherally spaced supports, the combination of: a hood blank feeding means including a stack for hood blanks, a reciprocable carrier movably positioned beneath the stack, said carrier being adapted to carry two hood blanks at the same time, vertically reciprocable pneumatic stripper means positioned beneath said stack and adapted to remove hood blanks from said stack and deposit them on said carrier, a positioning frame above said rotatable table, means for rotating said positioning frame and table simultaneously, an applicator device in the path of travel of said carrier and between said stack and positioning frame, and means for vertically reciprocating said applicator into operative engagement with a hood blank on said carrier.

12. In a bottle hooding machine of the turret type, including a rotatable table provided with vertically movable peripherally spaced supports, the combination of: a hood blank feeding means including a stack for hood blanks, a reciprocable carrier movably positioned beneath the stack, said carrier being adapted to carry two hood blanks at the same time, vertically reciprocable pneumatic stripper means positioned beneath said stack and adapted to remove hood blanks from said stack and deposit them on said carrier, a positioning frame above said rotatable table, means for rotating said positioning frame and table simultaneously, an applicator device in the path of travel of said carrier and between said stack and positioning frame, means for vertically reciprocating said applicator into operative engagement with a hood blank on said carrier, means for vertically adjusting said stack, stripping means and applicator simultaneously, and latch means between said stack and applicator for retaining a hood blank in position above said applicator during rearward motion of said carrier.

13. In a bottle hooding machine of the turret type, including a rotatable table provided with a plurality of peripherally spaced vertically movable supports, the combination of: a positioning frame above said table, means for rotating said positioning frame and table simultaneously, means for feeding bottles onto said table, means for feeding precut bottle hoods onto said positioning frame in timed relation with the rotation thereof, said feeding means including a stack for hood blanks, a reciprocable carrier movably positioned beneath the stack, pneumatic stripper means for taking blanks from said stack and depositing them on said carrier, an applicator in the path of travel of said carrier and between said stack and positioning frame, and means actuated by bottles fed to said table for energizing said stripping means and applicator.

14. In a bottle hooding machine of the turret type, including a rotatable table provided with a plurality of peripherally spaced vertically movable supports, the combination of: a positioning frame above said table, means for rotating said positioning frame and table simultaneously, means for feeding bottles onto said table, means for feeding precut bottle hoods onto said positioning frame in timed relation with the rotation thereof, said feeding means including a stack for hood blanks, a reciprocable carrier movably positioned beneath the stack, pneumatic stripper means for taking blanks from said stack and depositing them on said carrier, an applicator in the path of travel of said carrier and between said stack and positioning frame, said applicator including a housing for liquid, vertically adjustable cylinders in said housing, wick means in said cylinders, foraminous members carried by said cylinders at their upper ends and a porous fabric covering said foraminous members, and means actuated by bottles fed to said table for energizing said stripping means and applicator.

15. In a bottle hooding machine of the turret type, including a rotatable table provided with a plurality of vertically movable supports, the combination of a centrally positioned vertically adjustable post, a head frame, and a centering frame journaled on said post, means for simultaneously rotating said table, head frame and centering frame, a stationary cam track holder above said head frame, a plurality of forming heads carried by the head frame in peripherally spaced relation and above each of said vertically movable supports, means for feeding bottles onto said vertically movable supports and for discharging bottles from said supports, means adjacent the bottle feeding means for feeding precut hood blanks onto the centering frame in timed relation with the rotation of said table, means actuated by bottles fed to said rotatable table for actuating said blank feeding means, and means, adjacent the point of discharge of bottles from said supports, for stopping said rotatable table upon contact with an imperfectly formed hood on a bottle.

16. In a bottle hooding machine of the turret type, including a rotatable table provided with vertically movable peripherally spaced supports, the combination of: a hood blank feeding means including a stack for hood blanks, a reciprocable carrier movably positioned beneath the stack, said carrier being adapted to carry two hood blanks at the same time, vertically reciprocable pneumatic stripper means positioned beneath said stack and adapted to remove hood blanks from said stack and deposit them on said carrier, a positioning frame above said rotatable table, means for rotating said positioning frame and table simultaneously, an applicator device in the path of travel of said carrier and between said stack and positioning frame, said applicator including a housing for liquid, vertically adjustable cylinders in said housing, wick means in said cylinders, foraminous members carried by said cylinders at their upper ends and a porous fabric covering said foraminous members, and means for vertically reciprocating said applicator into operative engagement with a hood blank on said carrier.

DON RAY.